(12) United States Patent
Jeanne

(10) Patent No.: US 9,133,935 B2
(45) Date of Patent: Sep. 15, 2015

(54) SEMICORRUGATED GASKET

(75) Inventor: Olivier Jeanne, Saint-Junien (FR)

(73) Assignee: CARL FREUDENBERG KG, Weinheim (DE)

( * ) Notice: Subject to any disclaimer, the term of this patent is extended or adjusted under 35 U.S.C. 154(b) by 74 days.

(21) Appl. No.: 13/992,104

(22) PCT Filed: Jan. 10, 2012

(86) PCT No.: PCT/FR2012/050060
§ 371 (c)(1),
(2), (4) Date: Jun. 6, 2013

(87) PCT Pub. No.: WO2012/095601
PCT Pub. Date: Jul. 19, 2012

(65) Prior Publication Data
US 2014/0197606 A1    Jul. 17, 2014

(30) Foreign Application Priority Data

Jan. 12, 2011 (FR) ...................................... 11 50262

(51) Int. Cl.
F16J 15/02    (2006.01)
F16J 15/06    (2006.01)
F16J 15/10    (2006.01)

(52) U.S. Cl.
CPC ................. F16J 15/02 (2013.01); F16J 15/024 (2013.01); F16J 15/061 (2013.01); F16J 15/106 (2013.01)

(58) Field of Classification Search
CPC ......... F16J 15/02; F16J 15/021; F16J 15/022; F16J 15/06; F16J 15/10; F16J 15/104
USPC .......................... 277/628, 637, 644, 648, 649
See application file for complete search history.

(56) References Cited

FOREIGN PATENT DOCUMENTS

DE    2605512 A1    8/1977

*Primary Examiner* — Gilbert Lee
(74) *Attorney, Agent, or Firm* — Harness, Dickey & Pierce, P.L.C.

(57) ABSTRACT

An elastomer sealing gasket (10) having a length (L) along a contour (C) and a cross section (S) of width (I) and of height (H) considered in a transverse plane (T) perpendicular to said length (L), wherein the cross section (S) has a geometry that is continuously varying along the length (L) of the gasket.

18 Claims, 3 Drawing Sheets

Figure 1:
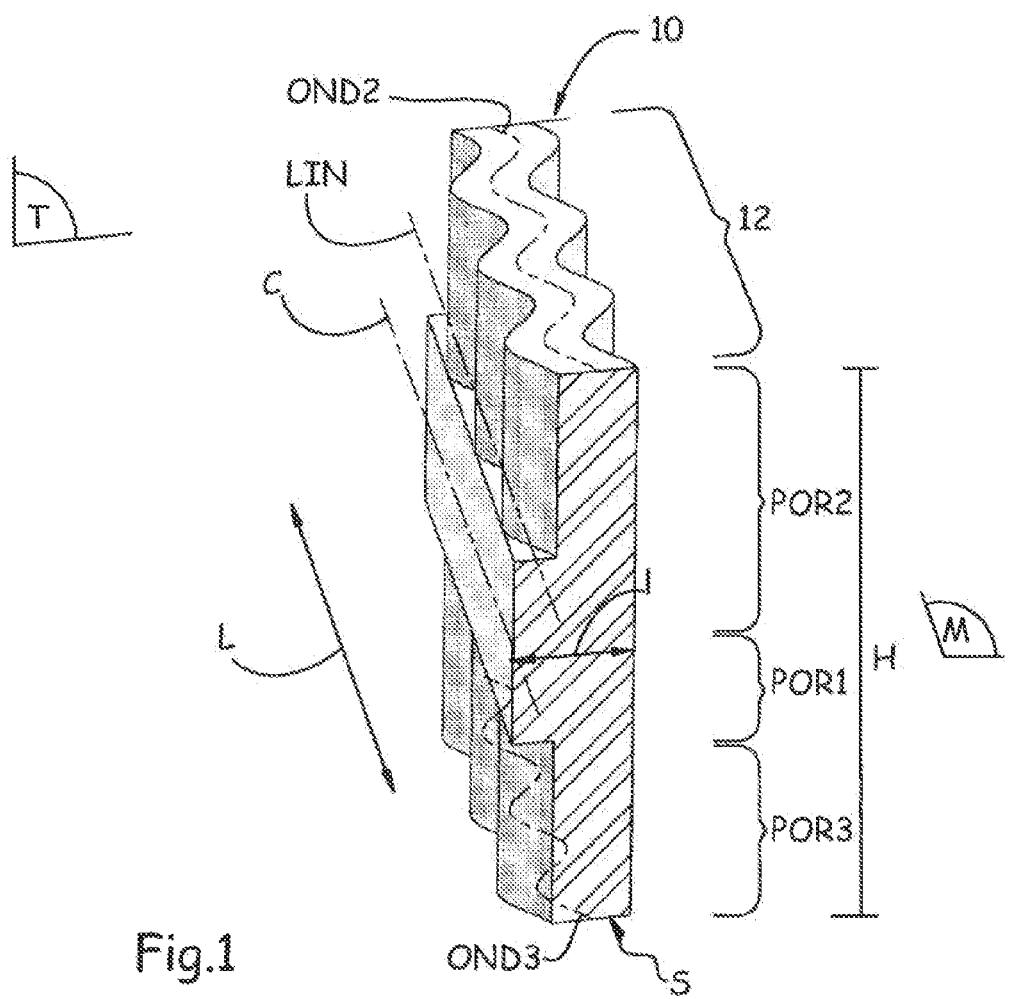

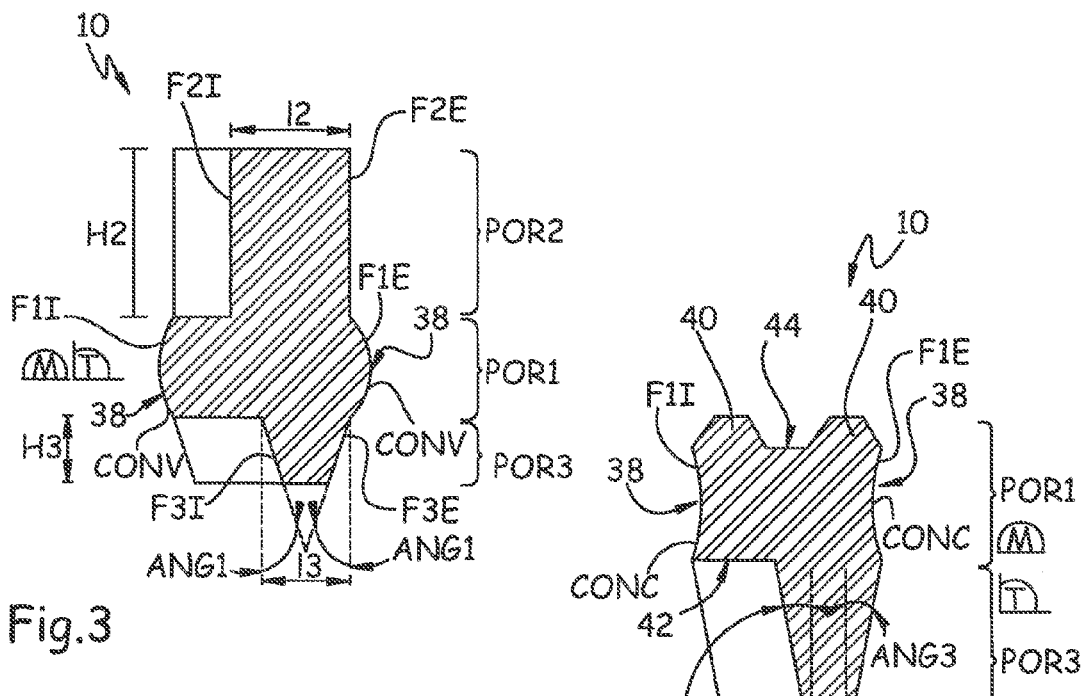
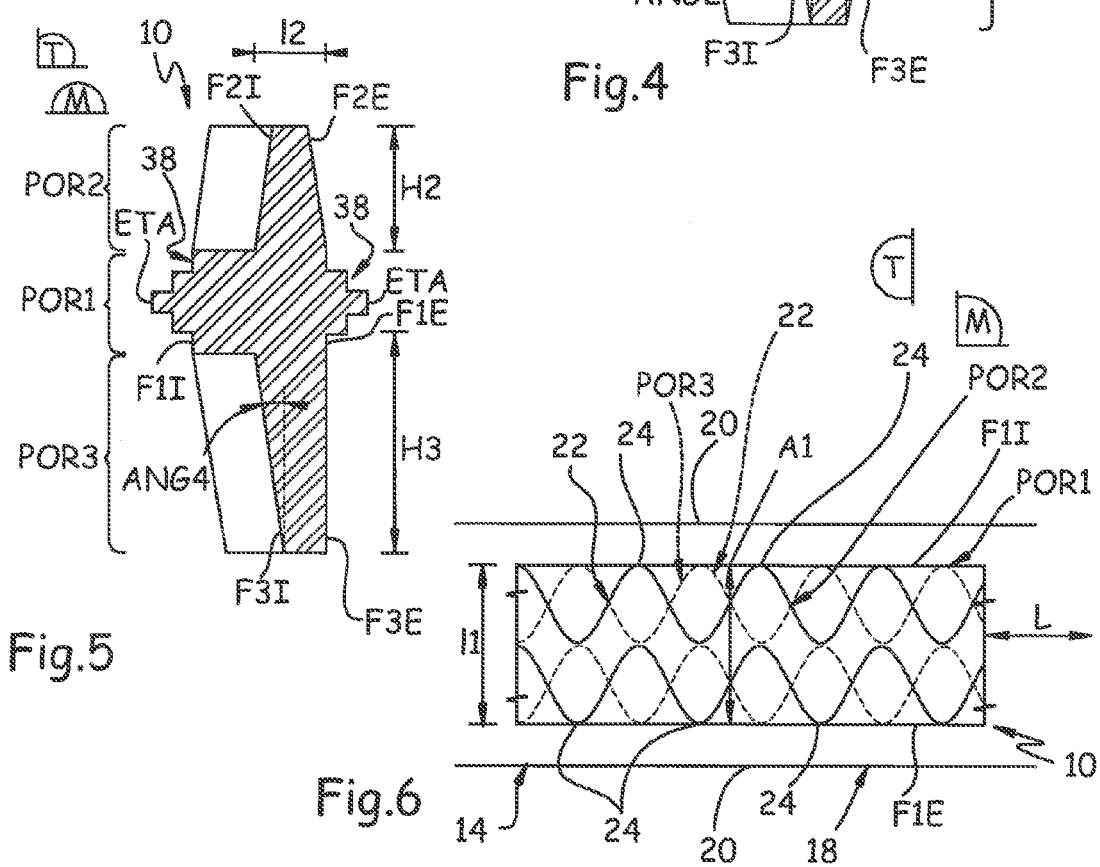

US 9,133,935 B2

SEMICORRUGATED GASKET

CROSS-REFERENCE TO RELATED APPLICATIONS

This application is a National Stage of International Application No. PCT/FR2012/050060, filed Jan. 10, 2012, which claims priority to French Application No. 11-50262, filed Jan. 12, 2011. The entire disclosures of each of the above applications are incorporated herein by reference.

FIELD

The present disclosure relates to an elastomer semi-corrugated sealing gasket placed and compressed into a slot such as a groove between two parts of an assemblage to be sealed.

BACKGROUND

This type of gasket makes it possible to ensure a seal in numerous applications, but the present disclosure relates more in particular to producing a seal in an engine such as, for example, in the cylinder head cover.

The meaning of elastomer gasket in this disclosure should be understood as a gasket made of rubber or a synthetic polymer.

The cost of a gasket made entirely of elastomer is relatively low; however, manufacturers always try to lower the cost of their products.

Also, since the cost of materials represents 50% of the total manufacturing cost of an entirely elastomer gasket, manufacturers seek to fulfill the sealing function with a minimum volume of material.

In connection with the above, the section of a gasket in accordance with the prior art is around 3 millimeters wide and 8 millimeters high. Further according to the prior art, such a gasket has a cross section with fixed geometry and follows a linear contour over the entire length of this gasket. Optionally, specific forms can be added locally and spread along the length of the gasket in order to ensure the seal in a non-plane zone such as a bearing arch, for example, or to ensure the seal with a third part of the assemblage.

However, such a gasket of the prior art remains characterized by a main section with fixed geometry.

With this type of section having a fixed geometry, a reduction in the height of the gasket causes a loss of compression and thus reduces the sealing capacity of the gasket.

On the other hand, by trying to limit the volume of material used in a gasket with a fixed section by reducing the width of this section, said reduction causes instability and a possible buckling of the gasket.

To counter any disadvantages of a reduction in the height and/or the width of a gasket with a fixed section, other specific shapes can be locally added in order to generate a retention force on this gasket in a groove and/or to preserve a good distribution of the compression forces. However, since these specific added shapes generally have a significant section in front of the gasket, the material gain obtained is thus relatively insignificant.

SUMMARY

Also, in accordance with a first objective, the present disclosure suggests mitigating the disadvantages of the prior art by proposing a design for an elastomer gasket that permits the reduction of the volume of material used to produce this gasket while retaining a good stability of the gasket and a good recovery of the compression forces, thus preserving the sealing capacity of the gasket.

According to another objective, the present disclosure also proposes a design for an elastomer gasket which makes it possible to locally adjust the resistance to the compression of this gasket.

To this end, the present disclosure has as its objective, an elastomer sealing gasket with a length following a contour and a cross section with a width and a height in a transverse plane perpendicular to this length. Said gasket is characterized in that the section has a continuously variable geometry along the length of the gasket.

DRAWINGS

Figure 2:
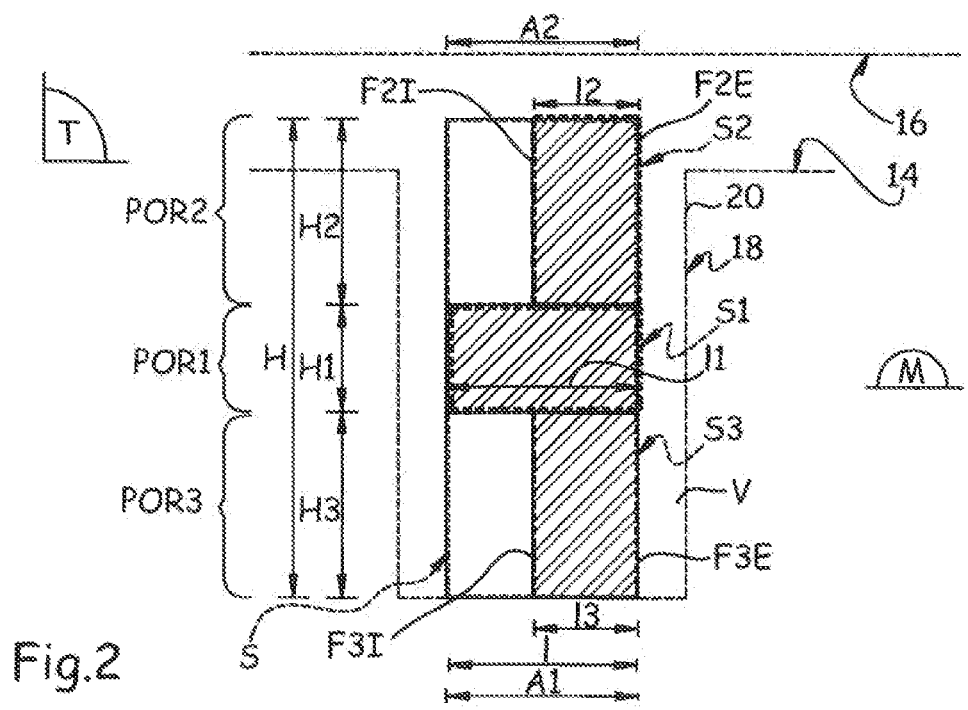

Other characteristics and advantages will become apparent from the description of the present disclosure. Said description is given solely as an example with reference made to the attached drawings, in which:

FIG. 1 shows a view in perspective of a section of a semi-corrugated gasket in a preferred embodiment in accordance with the invention, FIG. 2 shows a sectional view along a transverse plane of a semi-corrugated gasket in a preferred embodiment in accordance with the invention, FIGS. 3 to 5 show sectional views along a transverse plane of different variations of the production of the corrugated parts of a semi-corrugated gasket in accordance with the invention, and FIGS. 6 to 10 represent top views of a midplane of different embodiments of the corrugations of the corrugated parts of a semi-corrugated gasket in accordance with the invention.

DETAILED DESCRIPTION

The present disclosure relates to an elastomer sealing gasket 10.

The meaning of the term elastomer in the present disclosure should be understood as a gasket made from a synthetic polymer of rubber or of any other bendable material that can be compressed in order to produce a seal between two parts.

A section 12 taken along the length L of the gasket 10, shown in perspective in FIG. 1, illustrates the semi-corrugated design of the gasket in accordance with the present disclosure.

The present disclosure is described to produce a seal in the cylinder head cover in an internal combustion engine; however, this application is not limiting and this semi-corrugated gasket can make it possible to ensure a seal in numerous other applications.

Thus, as illustrated by dotted lines in FIG. 2, to produce a seal between a first part 14 such as a cylinder head cover and a second part 16 such as a cylinder head, the semi-corrugated gasket 10 is arranged in a slot 18 made within one of the parts (14, 16).

This slot 18 can consist of a groove 20 machined in one of the parts (14, 16), in the shoulders produced in each of the parts (14, 16), or in any other machining that permits the freeing of a volume V for receiving the semi-corrugated gasket.

The semi-corrugated gasket 10 has a length L following a contour C and has a cross section S with width I and height H in a transverse plane T in the length L of the gasket and perpendicular to this length L.

Moreover, a medial plane M of the gasket is taken from the height H of the gasket and perpendicular to this height H.

The contour C followed by the gasket 10 is preferably continuous and closed in such a manner as to surround one or more internal conduits to be connected, or one or more internal enclosed spaces to be tightly closed between the two parts (14, 16).

To be compressed between the two parts (14, 16) in order to ensure the seal of the assemblage, the height H of the semi-corrugated gasket 10 is greater than that of the slot 18, whereas the width I of the gasket is smaller than that of the slot 18. In order to reduce the volume of the material used to produce it, section S of the semi-corrugated gasket 10 has a continuously variable geometry along the length L of the gasket and the geometry of this section S therefore constantly changes shape in the length L of the gasket.

More precisely, at least one portion (POR2, POR3) taken in the height H of this gasket has a cross section (S2, S3) with a width (I2, I3) which is smaller than the width I of the gasket and follows a non-linear contour within the length L of the gasket, while at least one portion (POR1) taken in the height H of this gasket follows a linear contour in the length L of the gasket.

Gasket 10 preferably comprises within its height H:
a linear part POR1 following a linear contour LIN within the length L of the gasket, and,
at least one corrugated part (POR2, POR3) juxtaposed to the first portion POR1 at this height H and following a corrugated contour (OND2, OND3) within the length L of the gasket.

The linear portion makes it possible to dimensionally stabilize the semi-corrugated gasket in its length, whereas the corrugated part allows material to be saved and the linear and corrugated portions participate conjointly in the function of sealing the assemblage.

As a guideline, this combination between one portion of the constant section and one corrugated portion, makes it possible to save approximately 30% of the material used in a gasket having a constant section, while allowing the gasket to be correctly stabilized within its slot.

According to a first variant illustrated in FIG. 4 the gasket comprises a single corrugated portion POR2 or POR3 juxtaposed to the first portion POR1 above or below the latter within the height H of the gasket.

According to a second preferred variant illustrated in FIGS. 1, 2, 3 and 5 and making it possible to save the maximum amount of material used, the gasket comprises two corrugated portions POR2 and POR3 situated on both sides of the linear portion POR1 in the height H of the gasket with each corrugated portion (POR2, POR3) following a corrugated contour (OND2, OND3) in the length L of the gasket.

Nevertheless, in order to offer good resistance to the compression without using too much material, the width (I2, I3) of the cross section (S2, S3) of the corrugated portion (POR2, POR3) is at the most, equal to 80% of the width I1 of the cross section S1 of the linear part POR1.

As a guideline, with a linear portion having a width I1 equal to 1.8 millimeters, a corrugated portion having a width (I2, I3) equal to 1 millimeter, good resistance to compression, as well as good stability within its slot is conferred to the gasket.

In order to offer a good compromise, the width (I2, I3) of the cross section (S2, S3) of the corrugated portion (POR2, POR3) is preferably at least equal to 20% of the width I1 of the cross section S1 of the linear portion POR1.

Therefore, in the preferred variant of the embodiment in which the gasket comprises two corrugated portions POR2 and POR3 situated on both sides of the linear portion POR1 in the height H of the gasket, the width (I2, I3) of one of the two corrugated portions (POR2, POR3) can be greater than the width of the other corrugated part, as shown in FIGS. 3 and 5.

Further in this preferred variant of the embodiment having two corrugated portions, the corrugated portion (POR2, POR3) that is the least wide is preferably the one that is placed within the slot 18 in its entirety, whereas the corrugated portion that is the widest is mounted and protrudes from the slot 18 before compression of the gasket 10.

To avoid the stress concentrating at the ends of the height of the gasket during its compression and to distribute them in a more homogenous manner along its height, the height (H2, H3) of the cross section (S2, S3) of the corrugated portion (POR2, POR3) will preferably be equal at the most to 150° of the height H1 of the cross section S1 of the linear portion POR1, and the sum of the heights (H1, H2, H3) of the different linear and corrugated portions (POR1, POR2, POR3) will be substantially equal to the height H of the gasket.

In the preferred variant of the embodiment in which the gasket comprises two corrugated portions POR2 and POR3 situated on both sides of the linear portion POR1 at the height H of the gasket the height (H2, H3) of one of the two corrugated portions (POR2, POR3) can be greater than the height of the other corrugated portion, as is shown in FIGS. 3 and 5.

Furthermore, the highest corrugated portion (POR2, POR3) in this preferred variant of the embodiment with two corrugated portions, will be preferably the one that is placed entirely in the slot 18, whereas the least high corrugated portion is mounted and protrudes the slot 18 before compression of the gasket 10.

Then, as illustrated in the FIGS. 3, 4 and 5, at least one lateral face (F2I, F2E, F3I, F3E) of the corrugated portion (POR2, POR3) has a relief angle comprised between 0 and 15 degrees. This relief angle makes it possible to improve the stability of the gasket within its slot.

In the different variants of the embodiments shown in the FIGS. 3, 4 and 5 the two lateral faces (F2I, F2E, F3I, F3E) of the corrugated portion can have equal or different relief angles.

Thus, in FIG. 3, both faces (F2I, F2E) of the corrugated portion POR2 have a relief angle of zero, whereas both faces (F3I, F3E) of the corrugated portion POR3 have a relief angle ANG1 which is not zero.

In FIG. 4, the first face F3I of the corrugated portion POR3 has a relief angle ANG 2 greater than the relief angle ANG 3 of the other face F3 E of this corrugated portion POR3.

In FIG. 5, the first face F3 I of the corrugated portion POR3 has a relief angle ANG 4 that is not zero, whereas the other face F3E of this corrugated portion POR3 has a relief angle of zero.

In a preferred embodiment, the lateral faces (F2I, F2E, F3I, F3E) of the corrugated portion (POR2, POR3) have a relief angle of 3 degrees. In order to preserve a good stability of the semi-corrugated gasket within its slot 18, and to furnish a good recovery from the compression forces so as to preserve the sealing capacity of the gasket, as illustrated in FIG. 6, the corrugations 22 of the corrugated portion (POR2, POR3) have an amplitude (A1, A2) greater than or equal to the width I1 of the cross section S1 of the linear portion POR1.

Thus, as shown in FIG. 6, the corrugations 22 of the corrugated portion (POR2, POR3) may fall within a range (A1, A2) that is greater than or equal to the width I1 of the cross section S1 of the linear portion POR1.

Therefore, during the compression of the semi-corrugated gasket 10 within its slot 18, the crests 24 of these corrugations 22 come in contact simultaneously with the walls of the slot 18 and with the lateral faces (F1I, F1E) of the linear portion POR1. Together, the corrugated portion (POR2, POR3) and the linear portion POR1 thus ensure the sealing function.

However, the variants of the embodiments of these corrugations can allow the resistance to the compression of the gasket and increase the contribution of the corrugated portion to the sealing function along the entire length of the gasket or at least over a section along its length.

Figure 7:
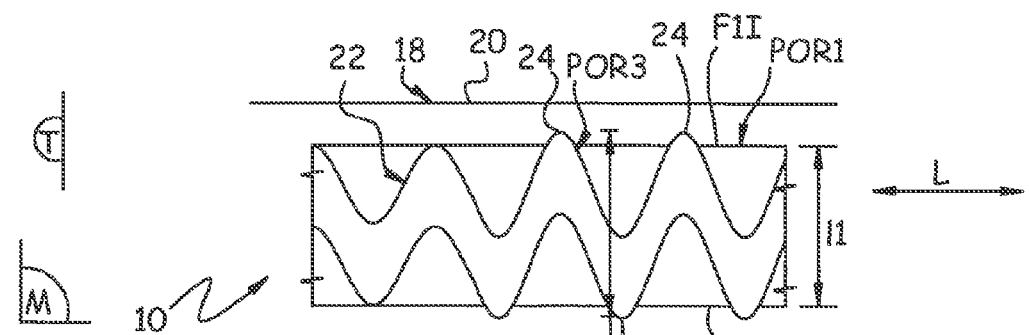

According to a first variant addressing these objectives and illustrated in FIG. 7, the corrugations 22 of the corrugated portion (POR2, POR3) may fall within a range (A1, A2) greater than the width I1 of the cross section S1 of the linear portion POR1 along the entire length L of the gasket 10 or at least along one section 26 of the length L of the gasket.

In this first variant, during the compression of the semi-corrugated gasket 10 within its slot 18, the crests 24 of these corrugations 22 come into contact with the walls of the slot before the lateral faces (F1I, F1E) of the linear portion POR1.

This enhancement of the sealing function fulfilled by the corrugated portion, allows the sealing capacity of the gasket to be adapted to certain sections of the gasket, for example, to be subjected to higher sealing fluid pressure and therefore is more capable of moving more under the effect of the pressure.

Advantageously, the increase (whether it is localized or not) in the range of the corrugations of the corrugated portion situated entirely within the gasket slot, thus makes it possible to improve the retention of the gasket within said slot.

Figure 8:
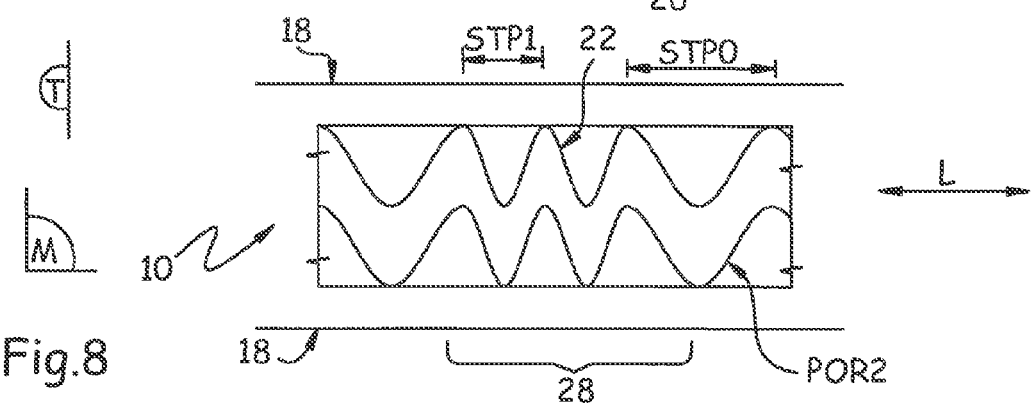

According to a second variant of the embodiment addressing the above-cited objectives and illustrated in FIG. 8, the space STP1 between two corrugations 22 of the corrugated portion (POR2, POR3) can be shorter in at least one section 28 in the length L of the gasket, than the space STP0 between two corrugations 22 outside of this section 28.

Figure 9:
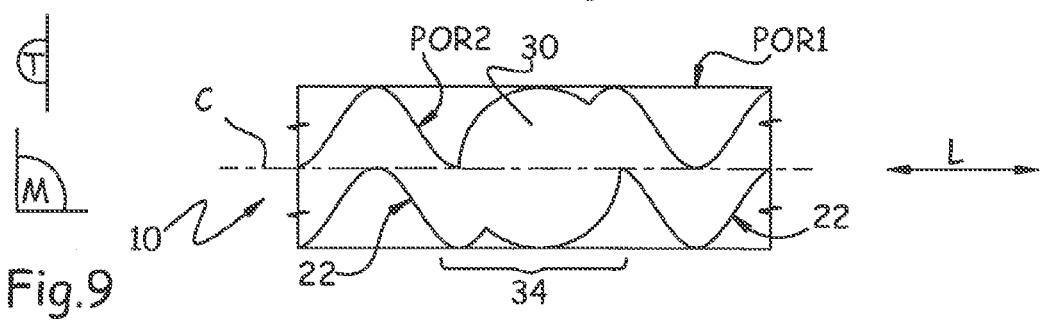
Figure 10:
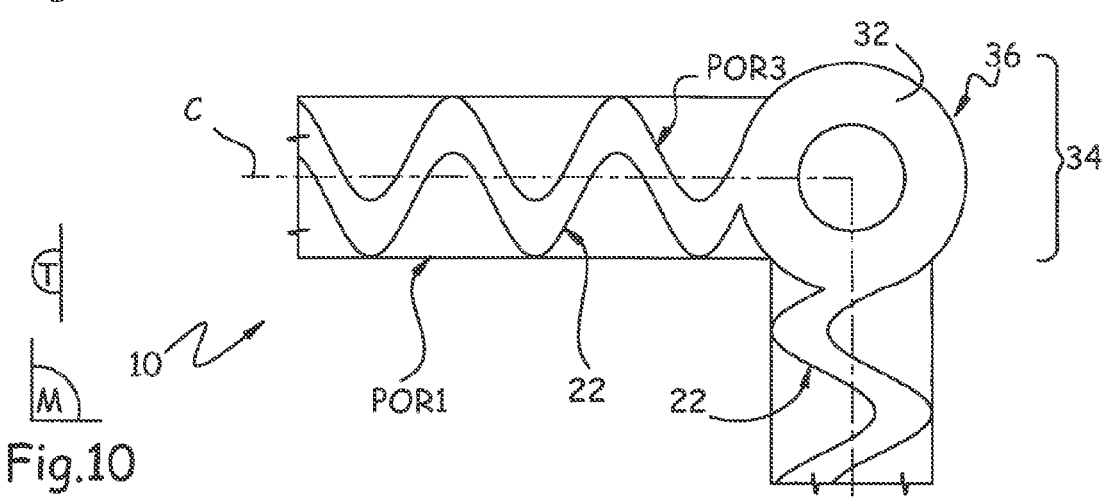

In a third embodiment addressing the above-cited objectives and illustrated in FIGS. 9 and 10, the corrugated portion (POR2, POR3) integrates at least one solid 30 or hollow 32 cylinder inserted between its corrugations 22 in at least one section 34 in the length L of the gasket.

Advantageously, and so as to improve the stability of the gasket 10 at a bend 36 of its contour C shown in FIG. 10, the corrugations 22 of the corrugated portion (POR2, POR3) can add a solid 30 or hollow 32 cylinder between them at this bend 36.

As illustrated in FIGS. 6 to 10, the corrugated contour (OND2, OND3) followed by the corrugations 22 of a corrugated portion (POR2, POR3) is preferably approximately sinusoidal.

However, the present disclosure also covers variants in which these corrugations follow a crenellated, triangular contour or any other contour running from one side to the other of the width I of the gasket.

Also, in the preferred embodiment with two corrugated portions, the present disclosure also covers variants in which the corrugations 22 of the one and/or of the other corrugated portion (POR2, POR3) are of a size (A1, A2) greater than the width I1 of the cross section S1 of the linear portion POR1 over the entire length L of the gasket 10 or in at least one section 26 in the length L of the gasket, or in which the space STP1 between two corrugations 22 of the one and/or of the other corrugated portion (POR2, POR3) is shorter in at least one section 28 in the length L of the gasket than the space STP0 between two corrugations 22 outside of this step 28, or in which the one and/or the other corrugated portion (POR2, POR3) incorporates at least one cylinder, solid 30 or hollow 32, inserted between its corrugations 22 in at least one section 34 along the length L of the gasket.

Finally, and as illustrated by dotted lines in FIG. 6, the present disclosure also covers a variant of the embodiment of the gasket 10 with two corrugated portions (POR2, POR3) in which the corrugations 22 of one corrugated portion are out of phase relative to the corrugations 22 of the other corrugated portion.

Preferably, and as illustrated in FIG. 2 the width I1 of the cross section S1 of the linear portion POR1 is approximately equal to the width I of the gasket.

However, in the variants illustrated in the FIGS. 3, 4 and 5 and to enhance the manufacturing process and/or the retention of the gasket, at least one lateral face (F1I, F1E) of the linear portion POR1 is equipped with means of restraint 38.

According to a first variant illustrated in FIG. 3, the means of restraint 38 takes the shape of a convex surface CONV that is approximately continuous along the length L of the gasket.

According to a second variant illustrated in FIG. 4 the means of restraint 38 takes the shape of a concave surface CONC that is approximately continuous along the length L of the gasket.

According to a third variant illustrated in FIG. 5 the means of restraint 38 takes the shape of a stepped surface ETA that is approximately continuous over the length L of the gasket.

Then, and especially in the embodiment of the gasket illustrated in FIG. 4 and comprising only one corrugated portion, the linear portion POR1 can comprise at least one protuberance 40 with a constant contour along the length L of the gasket at the level of its lower 42 and/or upper face 44, which protuberance forms a sealing rib that can improve the seal produced by the gasket.

Of course, the present disclosure covers the entire assemblage between two parts, in particular a cylinder head and a cylinder head cover, sealed with the aid of a semi-corrugated gasket such as was just described.

What is claimed is:

1. An elastomer sealing gasket for sealing between a first member and a second member, comprising:
    the elastomer sealing gasket having a length following a contour and a cross section with a width and a height in a transverse plane perpendicular to this length, wherein at least one corrugated end portion in the height of the gasket is adapted to engage one of the first and second members and has a cross section with a width smaller than the width of the gasket and follows a non-linear corrugated contour over the length of the gasket, while at least one linear portion in the height H of the gasket follows a linear contour over the length of the gasket.

2. The sealing gasket according to claim 1, wherein the width of the cross section of the at least one corrugated end portion is at the most equal to 80% of a width of the cross section of the at least one linear portion.

3. The sealing gasket according to claim 1, wherein the width of the cross section of the at least one corrugated end portion is at least equal to 20% of a width of the cross section of the at least one linear portion.

4. The sealing gasket according to claim 1, wherein a height of the cross section of the at least one corrugated end portion is equal at the most to 150% of a height of the cross section of the at least one linear portion.

5. The sealing gasket according to claim 1, wherein at least one lateral face of the at least one corrugated end portion has a relief angle comprised between 0 and 15 degrees.

6. The sealing gasket according to claim 1, wherein the non-linear corrugated contour of the at least one corrugated end portion is of a width greater than or equal to a width of the cross section of the linear portion.

7. The sealing gasket according to claim 6, wherein the corrugations of the at least one corrugated end portion are of a width greater than the width of the cross section of the linear portion over an entire length of the gasket or in at least one section over the length of the gasket.

8. The sealing gasket according to claim 1, wherein a space between two corrugations of the at least one corrugated end portion is shorter in at least one section over the length of the gasket than a space between two corrugations outside of this section.

9. An elastomer sealing gasket for sealing between a first member and a second member, comprising:
the elastomer sealing gasket having a length following a contour and a cross section with a width and a height in a transverse plane perpendicular to this length, wherein at least one corrugated end portion in the height of the gasket is adapted to engage one of the first and second members and has a cross section with a width smaller than the width of the gasket and follows a non-linear corrugated contour over the length of the gasket, while at least one portion in the height H of the gasket follows a linear contour over the length of the gasket, wherein the at least one corrugated end portion incorporates at least one solid or hollow cylinder inserted between its corrugations in at least one section over the length of the gasket.

10. The sealing gasket according to claim 1, wherein the non-linear corrugated contour followed by the at least one corrugated end portion is approximately sinusoidal.

11. The sealing gasket according to claim 1, wherein the elastomer sealing gasket follows a continuous and closed contour.

12. The sealing gasket according to claim 1, wherein at least one lateral face of the at least one linear portion is equipped with means of restraint.

13. The sealing gasket according to claim 12, wherein the means of restraint takes the shape of a stepped surface that is concave or convex.

14. The sealing gasket according to claim 1, wherein the at least one linear portion comprises at least one protuberance with a constant contour over the length of the gasket at its lower and/or upper face.

15. An elastomer sealing gasket for sealing between a first member and a second member, comprising:
the elastomer sealing gasket having a length following a contour and a cross section with a width and a height in a transverse plane perpendicular to this length, wherein at least one portion in the height H of the gasket follows a linear contour over the length of the gasket wherein the gasket comprises two corrugated end portions each adapted to engage one of the first and second members and situated on both sides of the linear portion along the height of the gasket with each corrugated end portion following a corrugated contour over the length of the gasket.

16. The sealing gasket according to claim 15, wherein a height of one of the two corrugated end portions is greater than a height of the other corrugated end portion.

17. The sealing gasket according to claim 15, wherein corrugations of one corrugated end portion are out of phase relative to corrugations of the other corrugated end portion.

18. The sealing gasket according to claim 15, wherein a width of one of the two corrugated end portions is greater than a width of the other corrugated end portion.

* * * * *